United States Patent
Reich, Jr.

(10) Patent No.: US 8,189,484 B2
(45) Date of Patent: May 29, 2012

(54) SYSTEM FOR DATA ARCHIVING AND SYSTEM BEHAVIOR PREDICTION

(76) Inventor: Richard D. Reich, Jr., Lake Orion, MI (US)

( * ) Notice: Subject to any disclaimer, the term of this patent is extended or adjusted under 35 U.S.C. 154(b) by 526 days.

(21) Appl. No.: 11/411,484

(22) Filed: Apr. 26, 2006

(65) Prior Publication Data
US 2006/0240990 A1    Oct. 26, 2006

Related U.S. Application Data

(60) Provisional application No. 60/674,870, filed on Apr. 26, 2005.

(51) Int. Cl.
    *G06F 11/00* (2006.01)
(52) U.S. Cl. ........................................ 370/241
(58) Field of Classification Search ............... 505/126; 370/241–253; 709/206–224
    See application file for complete search history.

(56) References Cited

U.S. PATENT DOCUMENTS

| | | | |
|---|---|---|---|
| 4,955,216 A * | 9/1990 | Barker et al. | 72/13.4 |
| 5,062,147 A * | 10/1991 | Pickett et al. | 714/46 |
| H1743 H * | 8/1998 | Graves et al. | 700/236 |
| 5,864,183 A * | 1/1999 | Fisher et al. | 290/43 |
| 6,023,507 A * | 2/2000 | Wookey | 709/224 |
| 6,297,742 B1 * | 10/2001 | Canada et al. | 340/635 |
| 6,912,634 B2 * | 6/2005 | Ripley et al. | 711/164 |
| 7,203,622 B2 * | 4/2007 | Pan et al. | 702/184 |
| 7,412,356 B1 * | 8/2008 | Dzenitis et al. | 702/189 |
| 2002/0056089 A1 * | 5/2002 | Houston | 725/9 |
| 2005/0111701 A1 * | 5/2005 | Seki et al. | 382/107 |
| 2006/0239185 A1 * | 10/2006 | Moore | 370/229 |

* cited by examiner

*Primary Examiner* — Derrick Ferris
*Assistant Examiner* — Mang Yeung
(74) *Attorney, Agent, or Firm* — Kohn & Associates, PLLC

(57) ABSTRACT

An electronic data analysis, storage, and retrievable system includes a verification capability for verifying the integrity of the system's operational health. An operation monitoring mechanism continuously monitors the system's operation. A collection mechanism contains relevant system data. The system further includes a storage ability for archiving system data. A media verification mechanism verifies the integrity and authenticity of storage media. Finally, a data analysis mechanism analyzes and compares archived system information.

25 Claims, 3 Drawing Sheets

SYSTEM FOR DATA ARCHIVING AND SYSTEM BEHAVIOR PREDICTION

CROSS-REFERENCE TO RELATED APPLICATIONS

This application claims the benefit of priority to U.S. Provisional Patent Application Ser. No. 60/674,870, filed Apr. 26, 2005, which is incorporated herein by reference.

BACKGROUND OF THE INVENTION

1. Field of the Invention

This invention generally relates to the field of electronic data storage, analysis, and recovery. Specifically, the invention relates to a system used for arranging and organizing data backup, computing system operation data, storing system data, monitoring and analyzing collected historical system data, predicting a future system occurrence, taking the appropriate steps to notify a specified party of a future occurrence, and taking the appropriate steps to correct or prevent a future occurrence.

2. Description of Related Art

Data backup is often recognized as a necessity for nearly all computer-based systems. Businesses and other enterprises that rely heavily on computer systems are often paralyzed in the event of a system failure or a data loss. These failures can lead to lost profits and high repair and recovery costs. Furthermore, many computer systems handle sensitive and valuable data, which holds significant value.

Because of the importance and value of continuous system operation and reliable data storage, a number of methods have been devised for data backup. Many of these methods employ large data storage media (such as tapes, high-capacity hard drives, etc.) that are used to periodically transcribe a system's body of data.

These backup systems, while effective in copying large amounts of data, have a number of shortcomings. Firstly, many systems do not employ a media management system, which tracks the appropriate media for a given backup. Secondly, present day backup systems do not continuously monitor a system's performance. And lastly, these systems are not able to predict when a system may become unstable, so that system failures can be predicted and prevented.

Additionally, the software industry is currently developing within a paradigm of scarcity. There is not enough storage capacity for current needs, so as little as possible is stored. According to Moore's Law:

". . . computing power per unit cost will continue to grow exponentially."

"In this form, "Moore's law" has a factual basis and has proven useful for planning purposes. The most rigorous interpretation of Moore's law is that the total number of transistors on the cheapest CPU will grow exponentially at a constant rate and that this constant rate produces a doubling every 12 (or 18, or 24) months. This variant oversimplifies a complex history."

(Quoted from Wikipedia) http://en.wikipedia.org/wiki/Moore's law

Assuming that doubling happens every 18 months, the industry, in all of its sub parts, will move from lack of capacity, to more than twice its current requirements. This shift to a "paradigm of plenty" needs to be recognized and understood in order to effectively capitalize on this increase in capacity. Excess capacity will exist in the form of both computing power and data storage. Two logical questions present themselves. What can be stored that we are not storing, and how can that data be used?

We can only store what we have, but increased storage capacity will allow us to include a certain subset of data that is currently being thrown away because it cannot be effectively or economically stored and retrieved. For some industries, this has changed, and for others it will change in the future. A file stored on any digital system (DVD, CD, Hard Drive, Tape Drive, SAN, WAN, etc.) contains a tremendous amount of associated data (termed 'meta-data'). In the example of a Hard Drive, such examples include file size, file creation date, last access date, last modification date, file permissions, and much more. A web server captures the number of times data was accessed, pages viewed, number of errors, and what IP address accessed the site. In most current systems, each of these pieces of information are recorded for a short time and then deleted. If not deleted, they are normally retained for liability purposes. In such a system, retained data is not stored in an effective manner. Using the proposed platform as described herein, the data can now be reconfigured to perform predictive analysis.

SUMMARY OF THE INVENTION

According to the present invention, there is provided an electronic data analysis, storage, and retrieval system including verification means for verifying the integrity of a system's operation, operation monitoring means for continuously monitoring a system's operation, collection means for obtaining relevant system data, storage means for archiving system data, media verification means for verifying the integrity and authenticity of storage media, and data analysis means for analyzing and comparing archived system information. The present invention also provides a data analysis system for analyzing and comparing collected information to predict a future result. Preferably, the present invention is directed towards a system, software program, and method for continuously monitoring a system's operation, collecting and analyzing relevant system data, archiving system data, and analyzing and comparing current system data with collected data to predict future system occurrences and behaviors.

The present invention also provides an electronic data analysis, storage, and retrieval method comprising the steps of: verifying the integrity of a system's operation, continuously monitoring a system's operation, collecting relevant system data, archiving system data, verifying the integrity and authenticity of storage media, and analyzing and comparing archived system information.

DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
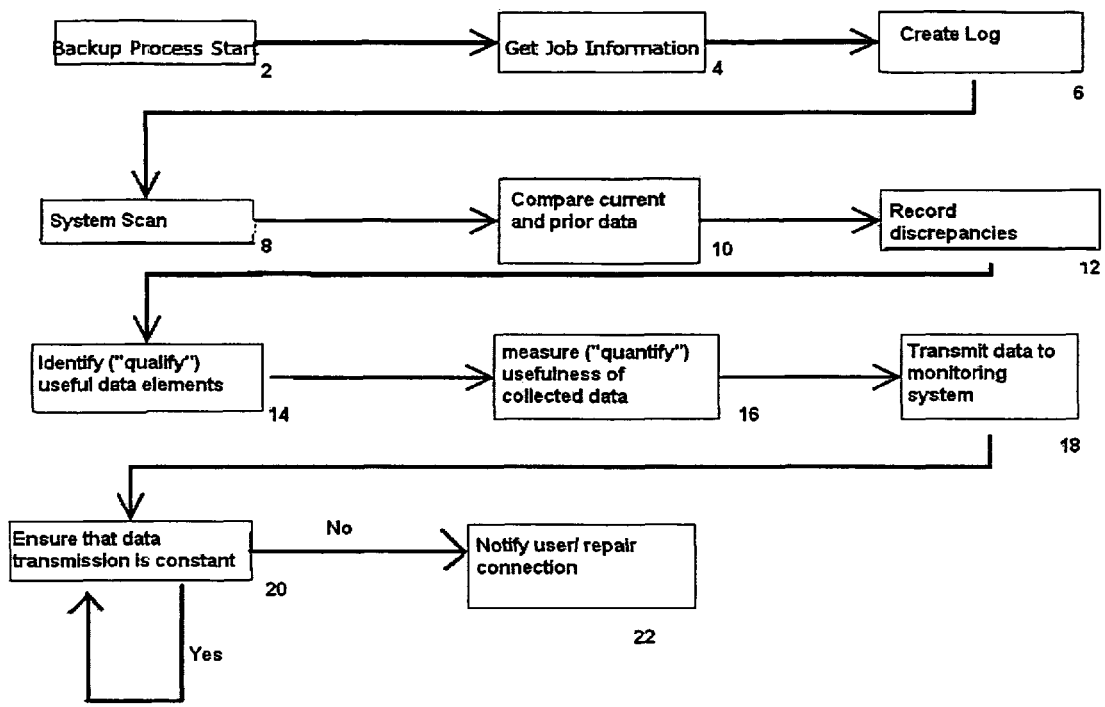
FIG. 1 is a process flow diagram of the present invention.

Generally, the present invention provides a method and system for collecting and analyzing system data, continuously monitoring system operation, coordinating data backup functions, and predicting future system occurrences based upon qualitative and quantitative historical analysis of system data.

The present invention is utilized for numerous reasons and in numerous settings. The present invention relates to various processes that include, but are not limited to, data backup, data analysis, system monitoring, coordination of data backup media, historical analysis of system data, and any other process that relates to data backup, qualitative and quantitative historical data analysis, and continuous system monitoring. Preferably though, the present invention is well suited for use with regard to a data backup and system monitoring process process, which integrates data storage and archiving, continuous system monitoring and data analysis, and predicting future system behaviors based upon quantitative and qualitative computations of historical system data.

The preferred embodiment of the present invention is for use in the data backup/systems maintenance field, although the present invention is operable in fields including, but not limited to, geology, meteorology, engineering and any other fields needing the data archiving, system monitoring, and qualitative and quantitative historical data analyzing systems and methods as described herein. In particular, the present invention is well suited in fields involving rapidly changing sensitive data, fields requiring continuous system operation and continuity, and fields requiring forecasting of future system behaviors.

In one of its current implementations, a backup application is storing 'Meta Data' (data that describes data) in a relational database. The term "Meta Data" in the context herein used refers to structural descriptions, stored as digital data that attempts to describe the essential properties of other discrete computer data objects. In fact, Meta Data can describe other Meta Data, and so on. It is organized and analyzed much like information in the stock market. Each type of Meta Data is assigned a weight that defines how important it is in the evaluation and prediction of what is occurring in the backup process. Once the weight is defined, mathematical formulas can be applied. An analogy drawn from the stock market is Stochastic, MACD, Oct. 30, 1990 (time period) moving averages.

Because the actions of a computer are much more deterministic than the stock market, related analysis provides a more accurate prediction. This enhanced predictability has been documented and used to successfully rectify a failure before it happened in a live production environment. The failing system was a Windows 2000 Server. Other applications have been developed, and are being developed to derive even more accurate predictivity.

The potential applications for this technology are significant. In a backup application, the time it takes to do each backup, the size of each backup, the number of files backed up, and the number of directories backed up are recorded. This information can then be compared on a technical, one-time basis, as well as on an historical basis. Any deviation from the history stored in the system can initiate a warning or identify an error. For example, if the backup takes 15% longer than its historical average, it can be compared to the amount of data currently being backed up. If there is an equivalent amount of data added to justify the extra time, no warning flag would occur. However, if no additional data has been added, or if even less data has been recorded the indication of potential problems would occur and preemptive action could be triggered.

Integrating this technology into existing firewalls also provides a significantly enhanced level of intrusion detection. For example, by monitoring the flow of traffic through a firewall and storing that information appropriately, any deviation from historical norms would immediately point to a possible attempt to breach the security of the system.

In turn, a reverse firewall monitors all outbound traffic. If a system is compromised by a Trojan that replicates itself via email, there would be a distinct and identifiable change from the norm. A compromised desktop system could be identified by the reverse firewall within micro-seconds, and be disconnected automatically from the network. The entire activity could be designed to take place without the intervention of a system administrator. Two benefits would occur. First, the network would be protected from other potentially disastrous infections. Second, the viability of the Internet would be served. The savings in lost man hours has the potential to be enormous (i.e. 500 systems×3 hours to clean each system=1, 500 hours).

File storage can also be monitored. By recording who has access to what over a period of time, the behaviors of employees can be profiled. If an employee accesses new areas, the unique activity can be isolated and verified as either legitimate or not. The obvious benefit is the potential for a reduction in destructive internal activity.

Information Lifetime Management (ILM) has become an important initiative in the computer industry. By monitoring files that are not accessed in a pre-determined amount of time, predictive information can be gathered to identify alternative access pattern intervals. By applying a margin of error to the intervals, the information can either be retained for future access, or marked for deletion or secondary storage.

Also, in the event of a significant virus attack, such as the "I Love You" virus, an email system could be enhanced with predictive properties to monitor the normal operation of events, and if the enhancement detects a significant increase in unique activity, the system can be shut down or throttled to protect the server from failure due to overload. Such predictive capability would again be based on an established history of normal behavior.

In all cases, the system has the ability to adapt to natural growth, with tolerances calibrated over a period of time. Using historic information, the system can recalibrate the tolerances to adjust to a gradual shift, mirroring the natural growth of an organization. In some applications, the system does not need the intervention or re-configuration of a system administrator because actions can be designed to be applied by the system independently. The actions can be complex, or as simple as notifying an administrator of a requirement for consideration.

The present invention generally operates through the use of a software program that allows for the continuous monitoring of a system's operation, the coordination of routine data backups, and data analysis means for analyzing historical data to predict future system behaviors. The present invention is also fully customizable and thus is adaptable for a variety of system types, data types, and media types. Moreover, the present invention is fully expandable for use in settings involving complex, enterprise-level systems, and large amounts of rapidly changing data.

The present invention is accessible through any device possessing the appropriate hardware capable of operating the system of the present invention. Appropriate devices include, but are not limited to personal computers (PC's), portable computers, hand-held devices, wireless devices, web-based technology systems, touch screen devices, typing devices, and any other similar electronic device. The user interacts with the system using a graphical user interface (GUI), which configures and controls the operation of the system. Entry of information occurs through input devices including, but not limited to, mouse/pointing devices, keyboards, electronic pens together with handwriting recognition software, mouse devices, touch-screen devices, scanners, and any other similar electronic input devices known to those of skill in the art.

The present invention works in unison with other networked devices, and also works independently on a single device. Thus, wired or wireless transmission from the device to a common server is possible. The data is stored on the device itself, a local server, a central server via the Internet, or a central data warehouse outside of a facility. The present invention allows for simultaneous, multiple users.

The present invention is compatible with all standard networks, such as Novell Netware, Unix NFS, Microsoft Windows (SMB and CIFS), etc.

The present invention includes a software program for all of the functions of the data backup and system monitoring system, including arranging and organizing data backup, computing system operation data, storing system data, monitoring and analyzing collected historical system data, predicting a future system occurrence, taking the appropriate steps to notify a specified party of a future occurrence, and taking the appropriate steps to correct or prevent a future occurrence.

The software program is accessible through communication systems including, but not limited to, the Internet, Intranet, Extranet, and any other similar digital network mechanism know to those of skill in the art. Additionally, the software can be interfaced and integrated with currently existing software programs involving digital data such as Microsoft Office, Microsoft Outlook, and other such business software programs, as well as existing electronic document storage systems, including databases.

FIG. 1 represents a process flow diagram of the present invention. The backup process is started (2) by the system scheduler, and the system loads all information relevant to the present backup job (4). The scheduler can be implemented as a standard 'vixie-cron' software package (which initiates programs based on time and/or date), or as an integrated scheduling program within the backup system. A log is created (6), which continuously logs information relating to the system's operation and integrity. The log is a time-stamped record of the meta-data of the associated operation. Each operation provides meta-data that is recorded with a time stamp and is inserted into a file or database to be uploaded to the central server. The system then scans the given computer system (8), taking inventory of system information such as available memory (RAM), available hard disk space, as well as currently running programs. This information is compared (10) with archived system information, reflecting the expected values for each piece of system information (available memory, hard disk space, etc.). Any discrepancies between the current and expected system operation are recorded (12).

The system then computes a value based upon the current collected system information. In doing so, the system identifies ("qualifies") (14) the useful elements of the collected information, and measures ("quantifies") (16) the usefulness of this identified data. Alternatively, the system can be configured so that the system "qualifies" the relevant data, and then alerts or reports the results to a human user or administrator, who is then capable of measuring ("quantifying") the value of this data. The system can also be configured to analyze any number of system or network data items (i.e., hard disk integrity, network flow, network integrity, etc.). This information is transmitted (via an electronic communication interface such as the Internet) (18) to a remote monitoring system. Alternatively, this process can occur locally, within the given computer, thereby negating the necessity of an electronic connection or a remote system. The transmission of this information at regular intervals (as determined by the system administrator) is a strong indication that the given computer is operational (20). If the remote monitoring system senses that a certain number of intervals have passed without data transmission, the remote monitoring system notifies the appropriate party (based upon pre-determined system settings), and/or attempts to repair the connection (22). Meta-data is also transmitted and archived by a central server to perform historical analysis for predictive purposes.

In the event of an interruption, the system also provides a powerful interface for viewing and sorting the collected system data. The user may view the system operation log, and can track the system's performance based on the previously collected system data. This interface allows the user to pinpoint various system errors or malfunctions that may have lead to a system failure.

Figure 2:
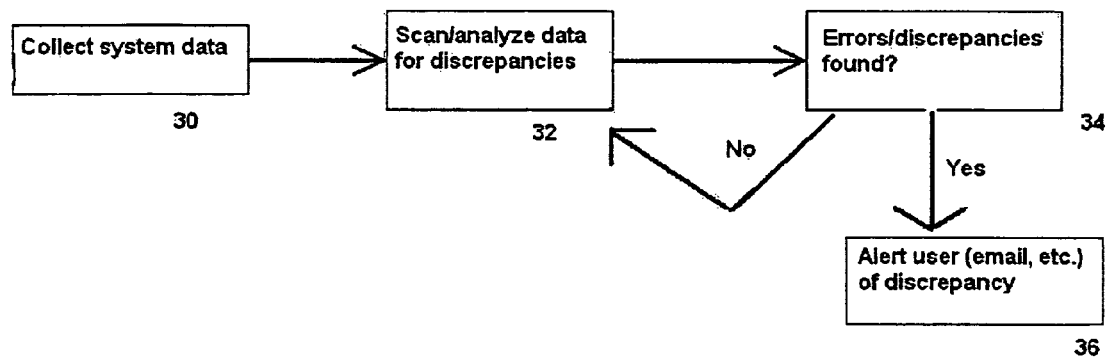
FIG. 2 is a process flow diagram of the notification system.

The notification system is then initiated. FIG. 2 represents a process flow diagram of the notification system. This system collects (30) all relevant system data, as well as any system failures/warnings, and stores and analyzes this data for further reporting process (32). If any errors are detected (34), based upon the comparison of current system values with the system's historical values (using the data qualified and quantified above), the notification system alerts the user (36) of the discrepancy. Furthermore, the system analyzes the stored historical data to identify the parameters of the system's normal operating state. Once enough data is collected, the system can accurately define the expected normal operating state, and can alert the user whenever the system's operational data deviates from it.

Figure 3:
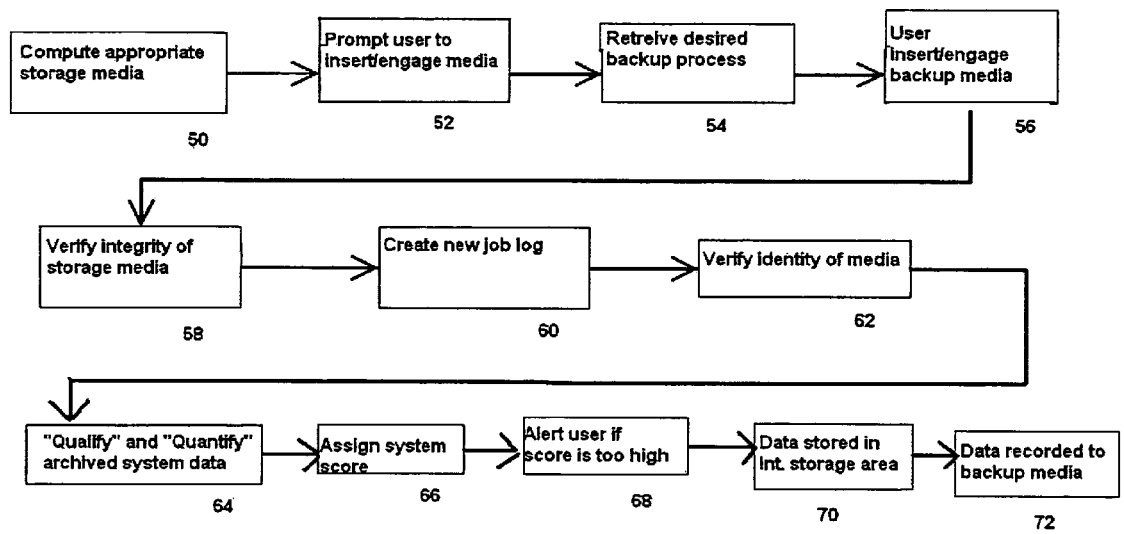
FIG. 3 is a process flow diagram of the backup/media verification system.

FIG. 3 represents a process flow diagram of the backup/media verification system. The system computes the appropriate media to be used for the current data backup (50), and prompts the user accordingly (52). The system then retrieves the desired (either selected automatically by the system, or manually by the user) backup process (54) from the backup configuration information. The user inserts the appropriate storage media (hard drive, tape drive, DVD-R, etc.) (56), and the system verifies the integrity of the inserted media (58). Then, the system creates a new job log (60), which continuously logs the status and results of every step in the backup process.

The system verifies that the expected and appropriate storage media is present (62). If the expected media is not present, the system sends a warning to the user not to overwrite the media.

The system utilizes the collected and archived system data to calculate the way the system being analyzed will behave or respond in the future (64). The system first identifies ("qualifies") important and relevant portions of the collected system and backup data and meta-data (data recorded based on the collected system data). This identified ("qualified") data is then weighed ("quantified"), to determine its relative value, from the perspective of the entire system's operation, or any other such value. Alternatively, the system can be configured so that the system "qualifies" the relevant data, and then alerts or reports the results to a human user or administrator, who is then capable of measuring ("quantifying") the value of this data. The data and meta-data are further analyzed from a historical perspective, comparing them quantitatively and quantitatively with previously collected system data. The results of this analysis are attributed a value, which is added to an overall system 'score' (66). If the system 'score' reaches a pre-determined point (as determined by the user and the system), the system alerts the user that the present computer may be unstable (68). To calculate the proper system 'score,' the system analyzes the stored historical data to identify the parameters of the system's normal operating state. Once enough data is collected, the system can accurately define the expected normal operating state, and can alert the user whenever the system's operational data deviates from it. Further deviations from the norm prompt further alerts to the user. In this fashion, even a slight deviation from a computer's expected operation can help predict a system failure or malfunction. The results of this data analysis, together with the data backup itself, are stored in an intermediate storage area (i.e., central hard drive or other such mass storage device) (70), and are further stored on recordable media (i.e., CD-ROM, DVD-ROM, etc.) for backup purposes (72).

Throughout this application, various publications, including United States patents, are referenced by author and year and patents by number. Full citations for the publications are listed below. The disclosures of these publications and patents in their entireties are hereby incorporated by reference into this application in order to more fully describe the state of the art to which this invention pertains.

The invention has been described in an illustrative manner, and it is to be understood that the terminology, which has been used is intended to be in the nature of words of description rather than of limitation.

Obviously, many modifications and variations of the present invention are possible in light of the above teachings. It is, therefore, to be understood that within the scope of the appended claims, the invention can be practiced otherwise than as specifically described.

What is claimed is:

1. An electronic data analysis, storage, and retrieval system comprising:
    a verification device for verifying integrity of a system's operational health;
    a operation monitor for continuously monitoring a system's operation;
    a data collector for obtaining relevant system data;
    a storage device for archiving system data;
    a media verification device for verifying integrity and authenticity of a storage media;
    a data analyzer for analyzing and comparing archived system information;
    a quantification device for measuring a value of a given piece of backup data and meta-data and attributing the value to said given piece of backup data and meta-data, wherein the meta-data indicates at least one of time it take to do each backup, the size of each backup, a number of files back up, and a number of directories backed up for a backup process;
    a notification device for notifying abnormalities of the backup process based on a comparison between the meta-data and a historical average; and
    a warning device for altering or reporting results of the quantification device to an operator.

2. The system of claim 1, wherein said verification device is defined as a verification system for obtaining relevant system operation information.

3. The system of claim 2, wherein said verification system includes a software program which compares and verifies current system operation information against typical system operation information.

4. The system of claim 2, wherein said verification system further includes validation means for validating the identity of a given computer or system.

5. The system of claim 1, wherein said operation monitor is defined as a monitoring system for continuously monitoring a system's operational health.

6. The system of claim 5, wherein said monitoring system includes a software program for computing system diagnostic information, an electronic communication interface for communicating said diagnostic information to a remote monitoring system, and a remote monitoring system for monitoring the computed diagnostic information.

7. The system of claim 5, wherein said monitoring system further includes a software program for continuous real-time analysis of communicated system diagnostic information.

8. The system of claim 5, wherein said monitoring system further includes a notification system for notifying relevant parties of abnormalities in computed diagnostic information.

9. The system of claim 5, wherein said monitoring system further includes a data archive for storing all previously computed system diagnostic information.

10. The system of claim 5, wherein said monitoring system further includes a locally residing software program for computing system diagnostic information, and an electronic communication interface for communicating said diagnostic information to a monitoring system.

11. The system of claim 1, wherein said data collector is defined as a system for obtaining relevant system data.

12. The system of claim 1, wherein said storage device is defined as a storage system for archiving system data.

13. The system of claim 12, wherein said storage system includes a data storage medium.

14. The system of claim 12, wherein said storage system further includes an intermediate storage area for storing recent system information and data backups.

15. The system of claim 1, wherein said media verification device is defined as a media verification system for verifying the integrity and authenticity of storage media.

16. The system of claim 15, wherein said media verification system includes a software program for checking the integrity and identity of the data storage media.

17. The system of claim 15, wherein said media verification system further includes a software program for assigning a unique ID to all data storage media.

18. The system of claim 15, wherein said media verification system further includes an archiving system for storing data related to the operation of the data storage media.

19. The system of claim 1, wherein said data analyzer is defined as a data analysis system for analyzing and comparing archived system information.

20. The system of claim 19, wherein said data analysis system includes a software program for calculating the relevance of data from a historical perspective.

21. The system of claim 19, wherein said data analysis system further includes a qualification system for identifying useful data.

22. The system of claim 21, wherein said qualification system further includes analyzing a given piece of data from a historical perspective, based on archived system data.

23. The system of claim 21, further including a computation program for evaluating the change and rate of change in a set of accumulated system data.

24. The system of claim 21, further including a computation program for computing the significance of a given piece of data.

25. The system of claim 21, further including an alert system for notification of significant system computations.

* * * * *